United States Patent [19]
Ellis

[11] 4,214,499
[45] Jul. 29, 1980

[54] CUTTER TOOL WITH A PLURALITY OF HARD CUTTING TEETH

[76] Inventor: Glynn A. Ellis, Canal St., Long Eaton, Nottingham, Nottinghamshire, England

[21] Appl. No.: 897,284

[22] Filed: Apr. 17, 1978

[30] Foreign Application Priority Data

Apr. 16, 1977 [GB] United Kingdom ............... 15903/77

[51] Int. Cl.² ............................................ B27B 33/02
[52] U.S. Cl. ...................................... 83/855; 144/218; 83/835
[58] Field of Search ................. 83/835, 839, 854, 855, 83/852, 853; 144/223, 222, 218

[56] References Cited

U.S. PATENT DOCUMENTS

| 1,311,686 | 7/1919 | Goddard | 407/61 |
| 2,659,397 | 11/1953 | Drake | 83/852 |

*Primary Examiner*—Othell M. Simpson
*Assistant Examiner*—Roscoe V. Parker
*Attorney, Agent, or Firm*—Scrivener, Parker, Scrivener and Clarke

[57] ABSTRACT

A cutter tool of the kind having a blade body with teeth which are provided with hard material tips is so machined that the side faces of the tips are dished or otherwise concavely contoured.

The machining involves mounting the blade body on a worktable and first machining the side faces on one side of the tips to produce a reference plane including the ends of the cutting edges of the tip and using this plane as a reference plane for subsequent machining of the other side faces and the surfaces of the blade body.

9 Claims, 9 Drawing Figures

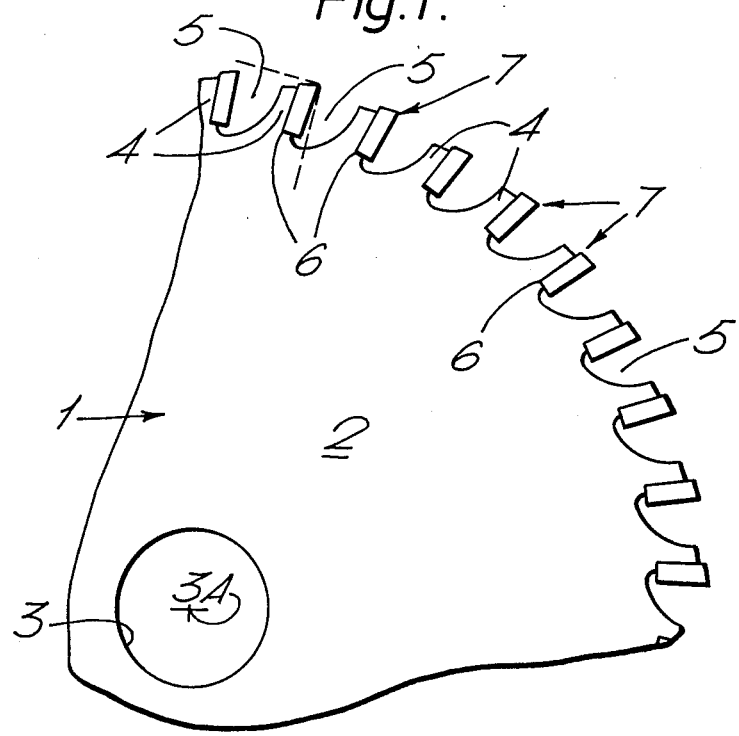
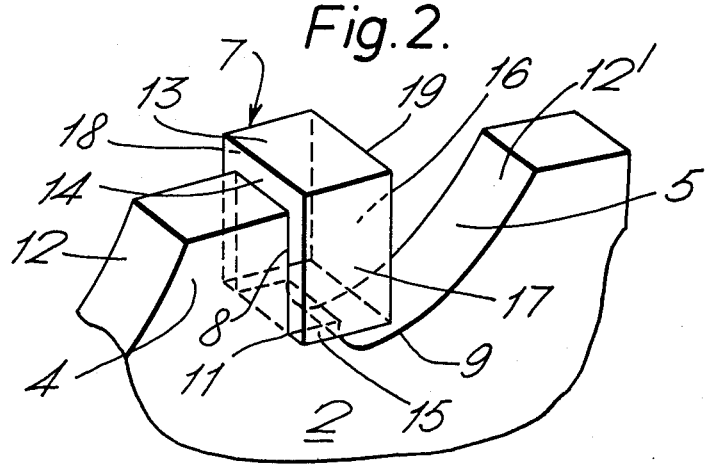

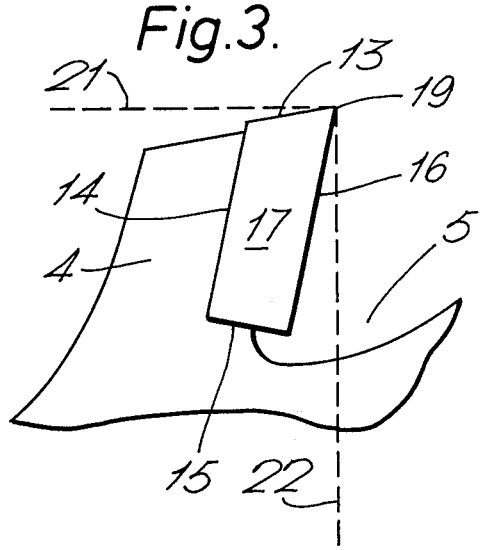
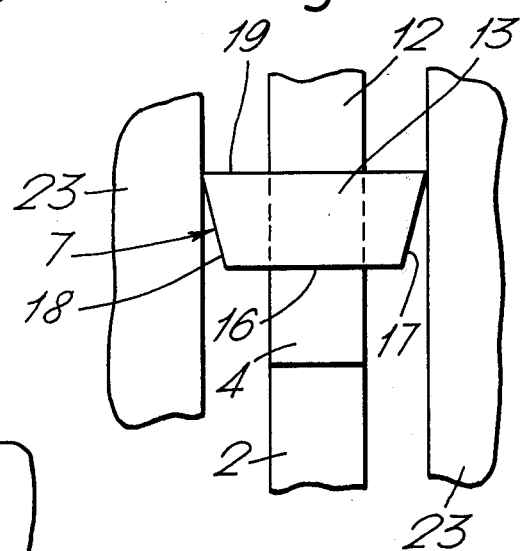
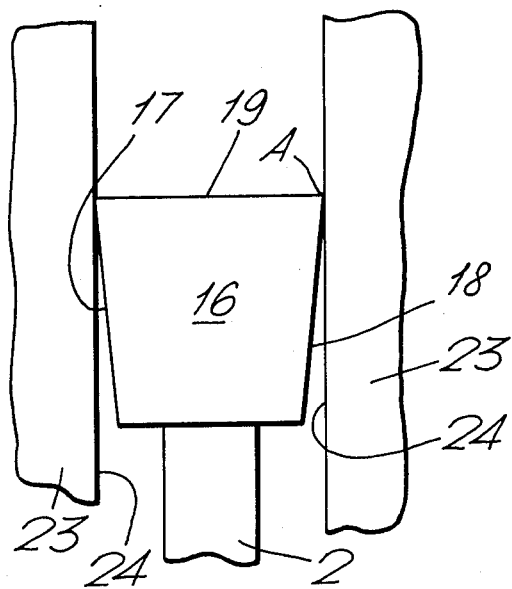

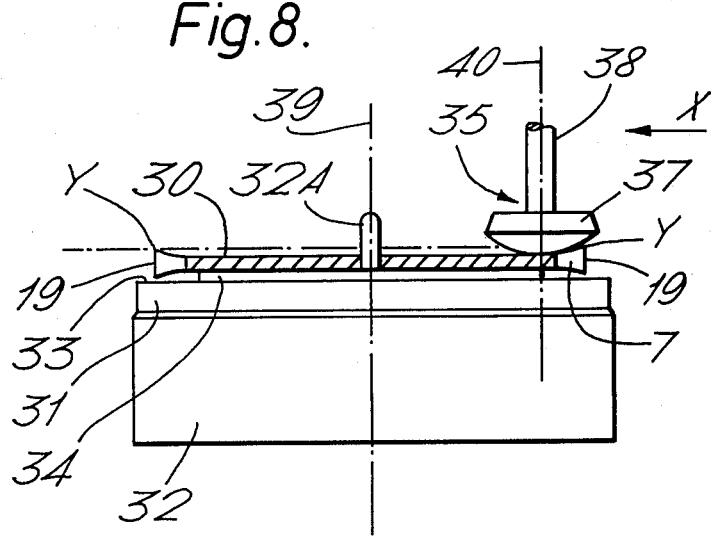
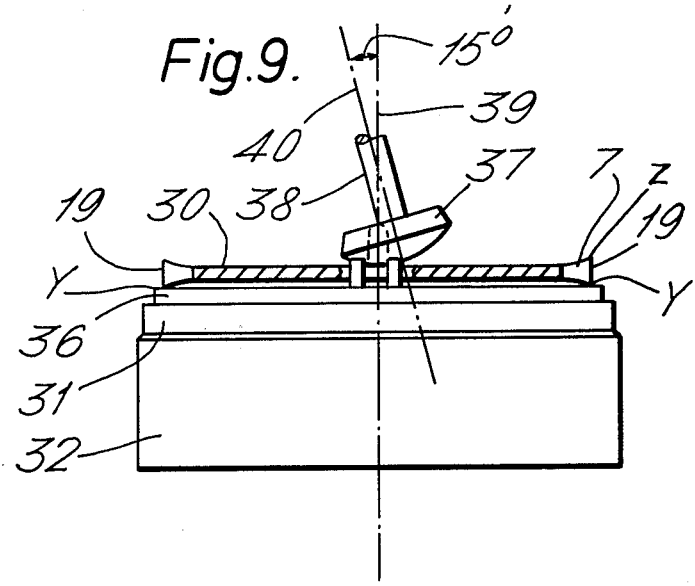

CUTTER TOOL WITH A PLURALITY OF HARD CUTTING TEETH

BACKGROUND OF THE INVENTION (1) Field of the Invention

This invention relates to cutter tools and to methods of grinding the cutters of such cutter tools.

In particular the invention is concerned with groove cutting tools such as rotary saws, or other cutter tools having a line of cutter teeth.

(2) Description of the Prior Art

In the case of a rotary saw this essentially includes a circular body with an arbor receiving bore and a plurality of regularly spaced radially directed teeth at the periphery of the body. The teeth are shaped to provide a cutting edge located in advance of the remainder of the tooth in the direction of advance of the tooth into a workpiece. Each such tooth is usually provided with a cutting tip of a harder material than the remainder of the blade. These tips are made of a variety of materials such as cobalt steel alloys, tungsten carbide or other materials. The tips are usually brazed or otherwise similarly secured to the associated tooth.

For the purposes of convenience the following description will be directed to rotary saws having a tip on every tooth, even though in some cases tips are provided on some of the teeth and not all.

Furthermore the principles of the invention to be discussed hereinafter could be applied to saws such as band saws, reciprocating machine actuated saws, hand saws and the like.

Various proposals have been made to provide hard tips on a cutter tooth. However, with the known proposals it has been found that when rotary saw blades having the known tip formations are rotated at high speeds, for example, at speeds having a peripheral speed of 40 to 70 meters per second, excessive noise levels are produced which create unacceptable operator working conditions. A particular form taken by the blade noise is a whistling sound which, depending upon factors such as the rotational speed of the blade, develops noise concentrations at various frequencies. It is thought that a possible source of the noise resides in vibrations arising from air pressure conditions within the gullets of the blade. In addition, as a direct consequence of inherent design and manufacturing factors the blade can be set into a sustained vibration so that the blade starts to ring, for example, like a bell.

It is an object of the invention to provide an improved cutter tool and methods for making such tools.

SUMMARIES OF THE INVENTION

According to a first aspect of the invention there is provided a method of machining the side faces of the tips of a cutter blade having a body with teeth provided with tips, the method comprising the stages of, supporting the blade in face-to-face relationship with a support means such that the portions of the tips adjacent the support means do not contact the support means, machining the tip side faces remote from the support means to a desired form and such that the ends of the cutting edges lie in a first common plane, removing the blade from the support means and remounting so that the tip ends lying in said first common plane are towards the support means and provide a supporting reference plane, machining the remaining tip side faces which are remote from the support means to a desired form and such that the other ends of the cutting edges lie in a second common plane which is parallel to the first common plane, and successively machining the side faces of the blade body so that these faces are parallel to said common planes.

Preferably, the blade is supported upon a rotatable surface which is capable of supporting the blade without distortion, and a grinding wheel having a domed grinding surface is so positioned relative to the tip side faces that the axis of rotation of the grinding wheel is located in a first plane which is perpendicular to the plane of the blade body and is inclined in a second plane which is transverse to the first plane and the plane of the blade body, whereby on successively presenting the ginding wheel to the tips the side faces of the latter are ground to a required form.

Conveniently, the support surface for the blade is rotatable so that on rotation thereof the tips are successively presented to the grinding tool.

A further aspect of the invention provides a cutter blade having a body with teeth that are provided with tips, wherein each tip has side faces which are of a dished contour.

Preferably, the dishing is such that it is composed of a compound curvature involving two axes of curvature contained in planes which are inclined to each other.

Preferably, one of said axes is parallel to the axis of the blade in the case of a rotary blade and perpendicular to the plane of the blade.

BRIEF DESCRIPTION OF THE DRAWINGS

Reference will now be made to the accompanying drawings in which:

FIG. 1 is a schematic side view of a part of a circular saw blade having tipped teeth, FIG. 2 is an oblique view to an enlarged scale of a fragment of a circular saw blade illustrating the formation of a tipped tooth, FIG. 3 is a schematic side view of a tipped tooth, FIG. 4 is a top view of the tipped tooth of FIG. 3, showing the tip located in a kerf, FIG. 5 is a face view of the tooth of FIGS. 3 and 4, FIG. 8 is a schematic view of an assembly for grinding a tip in accordance with the method of the invention, and FIG. 9 is a view of an assembly of FIG. 8 but in a direction at right angles to that of FIG. 8 and showing a later stage in the blade tip machining process.

DESCRIPTION OF THE BASIC RELATIONSHIPS BETWEEN THE VARIOUS FACES OF A TIP

Figure 6:
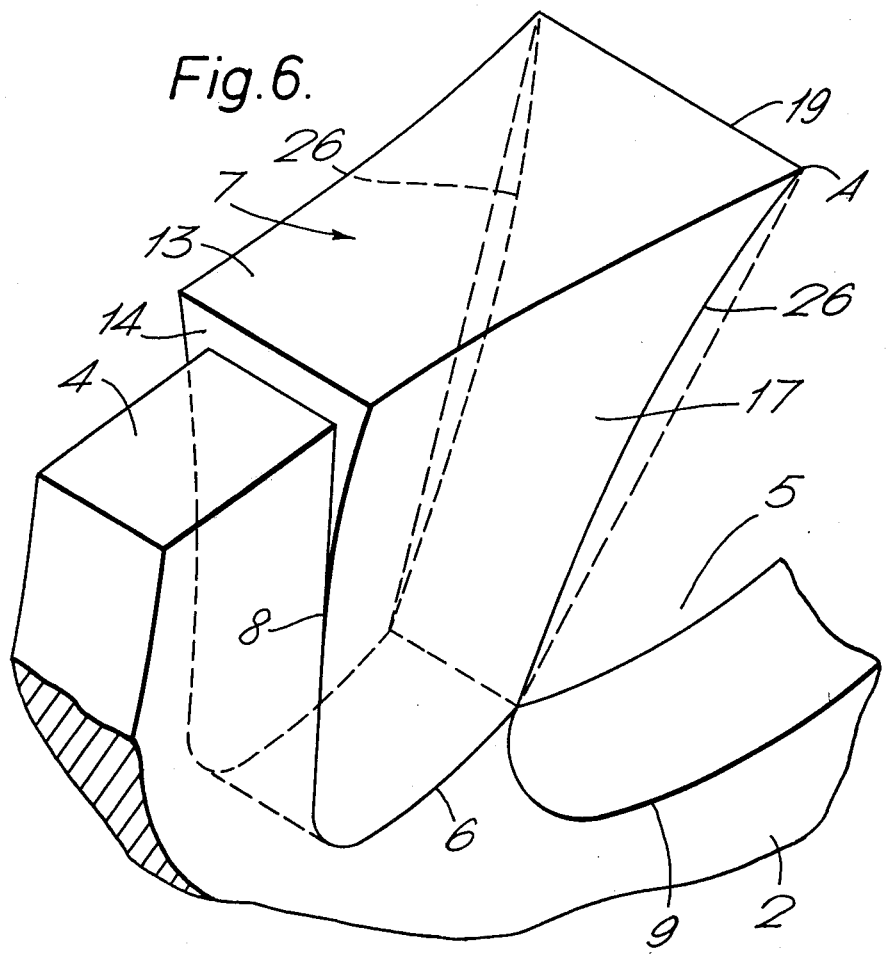
FIG. 6 is an oblique view of a tipped tooth incorporating the features of the invention.

Referring now to the drawings and more particularly FIG. 1 a circular saw blade 1 has a body 2 with a arbor aperture 3 having an axis of rotation 3A. Equidistantly spaced teeth 4 are provided on the blade periphery, therebeing a gullet 5 between each pair of teeth. Each tooth has a notch 6 for receiving and locating a shaped tip 7 of a material which is harder than that of the body 2.

As seen in FIG. 2 the tooth has a front face upper part 8, a front face lower part 9 separated by a step 11. The part 9 merges into and effectively forms the rear part of the adjacent gullet 5, whilst the rear face 12 of the tooth forms the forward part of a further gullet.

The tip 7 which is shown in FIG. 2 as a rectangular block has a top face 13, a rear face 14, a bottom face 15, a front face 16 and side faces 17 and 18.

The tip is secured into the notch 6 by securing the faces 14 and 15 to the tooth. The tip projects forwardly of, laterally to both sides and radially of the tip.

The intersection of the faces 13 and 16 produces an edge 19 which forms the cutting edge of the tip. As shown the edge 19 is parallel to the axis of rotation of the blade.

As so far considered the tip is not suitable for efficient cutting. In practice it is necessary to incline the top face 13 to a tangent plane 21 (FIG. 3) to a cylinder coaxial with the blade and passing through the edge 19. This inclination defines the top relief angle.

The front face 16 is inclined relative to a radial plane 22 passing through the edge 19. The side faces 17 and 18 are also inclined to each other to produce further clearance angles called the side flank relief angles.

FIG. 3 illustrates the top face inclination to the plane 21, and the inclination of the face 16 to the plane 22, this latter inclination being conventionally called the front clearance angle. The inclination shown is considered positive. An inclination in the opposite sense is considered negative.

FIG. 4 illustrates the tip and tooth when in a kerf having side faces 24 in a workpiece 23. This view clearly shows the side flank relief angles.

The side faces 17 and 18 are tapered in a downwards direction to provide at each side of the tip an angle called the tip face appearance angle. The formation of this face appearance angle is shown in FIG. 5, which is a face-on view of the tip in the kerf. The face appearance angle is essentially the angle between a plane parallel to the body of the blade and passing through the end A of the edge 19.

The above mentioned angles have been defined in relation to an edge 19 which is parallel to the blade axis. In practice the edge 19 is sometimes inclined to the radial plane 22 to displace the edge end remote from the end A either rearwardly or in advance of the end A. When the inclined cutting edge is used it is convenient for the edges to alternately inclined. Furthermore, the inclination of the edge 19 will affect the ultimate shapes of the various faces of of the tip 7.

The main difference between the parallel and inclined arrangement of the edge 19 is that the parallel edge affords a parallel cutting line of attack and the inclined edge affords a point-attack.

In practice the tip cutting action is affected by factors additional to those arising from the form of the tip. For example, the type and hardness of the material to be cut, blade thickness, speed of rotation, rate of cutting advance, the number of teeth, the nature of the material i.e., solid or tubular, etc.

The side relief angles cause a blade to tend to move sideways (particularly with the alternately inclined cutting edge arrangements) towards the kerf side walls so that the operational effect of a particular value of side relief angle is more pronounced when cutting solid objects than when cutting tubes of a similar material. This effect can be called snatch shock load. The effect is more prominent when thin walled material is cut since in such a situation a constant drag is not being employed.

The face appearance angle facilitates clearance of cut debris from the cutting regions. The top face relief allows space for the tip to be advanced into the workpiece with out excessive drag. The top relief and side relief angles are so interrelated that if the face appearance angle is increased to compensate for reduced side clearance (the latter normally being kept as small as possible) it is found that the length of the edge 19 becomes excessive relative to body thickness. Thus the adoption of an optimum side relief angle value could result in the width of the base of the tip being less than the blade thickness, thereby impairing the mechanical strength of the joint between the tip and tooth.

This problem has hitherto imposed limitations upon the minimum kerf width which can be cut when cutting metals at commercially acceptable cutting speeds. Furthermore, because of the need to maintain a desired level of operational stability of the known tipped saws the minimum possible kerf width has been limited to relatively wide values for example to 4 mm for a 300 mm diameter blade.

In addition the efficiency of the cutting action is affected by the choice of the front clearance angle. In addition, the overall effects are greatly controlled by the sense i.e., positive or negative, of the front clearance angle.

Thus for example, if a fast cutting speed is required i.e., in excess of 40 meters per second a negative front face angle can lead to the production of an irregular cut surface. When counteracting this in known tip formations by using positive face angle it is found that the tooth support to the edge 19 is adversely affected and, in addition, the tips cut with a snatching action. To avoid this problem it is usual to try to use a relatively large negative angle of $-4°$ to $-6°$. However, this in turn introduces a further difficulty that the tip operates with a scraping action rather than a cutting action, which scraping action greatly reduces the working life of the tip.

The adoption of the negative angle together with the most suitable side relief angle has been found to involve a high operational noise level. If negative hook is employed a thicker than normal saw body thickness is required to allow sufficient tooth/body strength to minimise side chatter deflection and to offer sufficient tooth strength to maintain additional stresses on a tooth so as not to break teeth off. The high operational noise level is believed to arise from resonance conditions being produced through its interaction with the workpiece, and also as a result of rotation movements of air entrained in the gullets 5.

DESCRIPTION OF BLADE TIPS PRODUCED BY THE METHOD OF THE INVENTION

Referring now to FIG. 6 this illustrates a tooth 4 with a tip 7. The tip has the various faces and associated angles mentioned in relation to the previous Figures.

The general dimensions of the tip 7 in relation to the tooth are such that the rear end regions of the side faces 17 and 18 are either substantially flush with or only slightly proud of the faces of the adjacent tooth. In a practical situation each rear end region extends within the range 0.0025 to 0.0180 inches for blades from 3 to 20 inches diameter from the adjacent part of the tooth. Also the base of the tip 7 is shaped so as to engage in the recess at the rear of the gullet 5 whereby the front face of the tip merges with and provides substantially the whole of the rear wall 12 of the gullet.

The length of the edge 19 is only slightly greater than the width of the tooth body and thus the blade section, the width being sufficient merely to attain adequate cutting clearance. Thus the edge 19 need only project 0.006 inches (0.125 mm) for a kerf of 0.075 inches (1.75 mm) and for example 0.015 inches (0.375 mm) for a kerf of 0.130 inches (3.25 mm).

Figure 7:
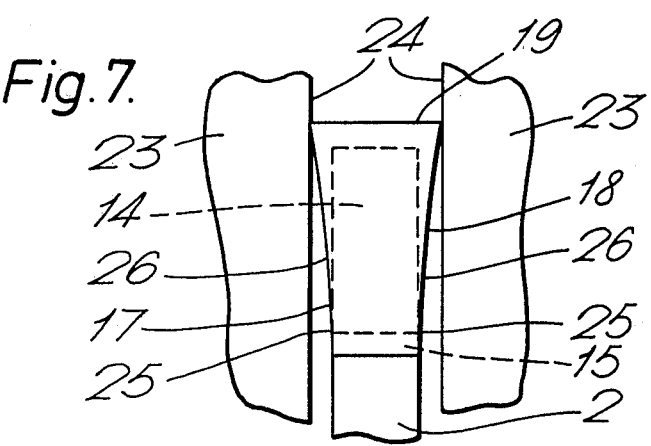
FIG. 7 is a detail of the tip of FIG. 6.

In the arrangement the side faces 17 and 18 are in accordance with the proposals of the invention undercut such that the surfaces 17 and 18 are concave or dished surfaces. The undercutting is such that, in a direction rearwardly and downwardly from the edge 19, immediately beneath the edge end A the rate of reduction of the width of the tip from a maximum width along the edge 19 is increased as compared with the reduction achieved by plane surfaces. The curved line 26 illustrates the effect of dishing on the line of intersection of the front face and the adjacent side face. FIG. 7 illustrates the junction of the above mentioned faces with the top face 13.

In other words bearing in mind that the freedom in the selection of the inclinations of the side faces 17 and 18 is limited in the known forms of tip, the effect of the above mentioned undercutting is to provide a way of effectively increasing the side relief angles without having to increase the overall width of the tip. Thus the undercutting makes it possible to provide a tipped tooth with adequate side relief without impairing the mechanical joint between tooth and tip.

In a typical construction the undercutting is such that the transverse width of the front face at a location where the front face is intersected by a cylinder with its axis coaxial with the blade axis and passing through the line of intersection of the rear and top faces is the same as the transverse width of the rear edge of the top face.

Thus, if the reduction in the radial length of the rear face of the tip, as compared with the radial distance of the point A, as a consequence of the formation of the top relief angle (i.e., by grinding) is defined as the top relief distance, the transverse width of the front face at the top relief distance is the same as the transverse width of the rear edge of the top face.

By providing this particular formation to the tip the unexpected advantage is obtained that in use the tip is effectively self furbishing since any wear tends to leave a sharp cutting edge. This effect has the great merit in that in order to maintain optimum sharpness and form of the tip it is only necessary to top grind the tip. With the known tips it is necessary to regrind the front, top and side faces.

It will be appreciated that said top relief distance has been defined in terms of the cutting edge end A. This is to take into account the difficulties of definition in relation to tips provided with rearwardly inclined or with rearwardly and downwardly inclined cutting edges.

In such cases the transverse width is then essentially the relevant two or three dimensional projection of the actual cutting edge to a line through the point A and a parallel to the axis of rotation of the blade.

Furthermore, in the case of non-circular saws i.e., those which at the zone of cutting are travelling along a rectilinear path, the top relief distance is taken relative to a plane parallel to the longitudinal direction of motion at the cutting region. The observations about the situation with inclined cutting edges will also be applicable.

When the undercutting is formed by concave dishing it is possible by suitable selection of the radius or radii of curvature and the location of the centres, as the case may be, of curvatures of the dishing with respect to the line of intersection of the top face 13 with the adjacent side face 17 or 18 to vary the resulting shaped and profile of the side face and thus correspondingly vary said rate of change of the tip width at the front face in the direction from the end A to the base of the front face. In any particular instance it will be appreciated the the actual shape of the dished side faces 17 or 18 will be a matter of the particular purpose of the blade and will be matters which can be readily ascertained without invention.

Furthermore, it is also possible to effect a selective control over the extent to which the dishing extends over the side face. That is to vary the dishing from a full radial length of the tip to a lesser distance lengthwise to the tip.

In addition, it is possible to vary the extent of the dishing in a direction from the front to the rear of the tip.

Thus the provision of the undercutting has the effect of providing the tip with such a formation that the contact between the workpiece and the tip is effectively reduced to substantially only the cutting edge region of the tip.

The undercutting of the side faces 17 and 18 has the effect of producing at each side of the tip a continuous air flow channel or passage from the front of the tip to the rear of the tip and tooth so that any tendency for air to resonate in the gullets 5 is reduced since the channels enable balancing of air pressure from front to rear of the tips during rotation of the saw.

Thus, the provision of the undercutting has resulted in a blade construction which exhibits a considerable reduction in noise levels as compared with a blade without tip side face undercutting.

The undercutting makes it possible to use a range of top relief angles ranging from 10° to 20°. A convenient angle is 15°.

In addition, since the side relief angle can be reduced to a minimum the selection of a front clearance angle can extend over a comparatively wide range of angles. A possible range is from 2° negative to 20° positive. A convenient angle is positive 15° when the top clearance angle is 15°.

When the undercutting is in the form of a concave dishing it is possible to provide a tungsten carbide tip having a thickness overall of less than one millimeter. For example, 0.626 mm and be capable of cutting to a depth of some 25 mm per minute in solid copper.

It will be understood from the forgoing that one of the principal problems in providing a tip formation according to FIGS. 6 and 7 is the undercutting of the side faces 17 and 18. In practice the form of the top relief and front clearance angles does not present any real practical problems and for the purposes of the following description in relation to the formation of the undercutting it will be presumed that the top and front faces have been ground or otherwise provided.

DESCRIPTION OF A METHOD OF UNDERCUTTING THE TIP SIDE FACES

Turning now to FIGS. 8 and 9 these Figures schematically illustrate a workpiece grinding assembly for producing the side face undercutting.

FIG. 8 is a schematic representation of blade 30 mounted upon a worktable 31 of a grinding machine 32, having a blade locating spigot 32A. In the Figure for the purposes of clarity only the diametrically opposite tips have been indicated, and the blade body has been shown in section. The worktable comprises an air or magnetic type of clutch or clamp which is able to hold a workpiece flat against the worksurface thereof without the need for screw clamps or the like. These units are well known in the machine tool industry and are readily available. Means (not shown) are provided for rotating the worktable as required, i.e., stepwise or continuous rotation.

Since the blade has been provided with tips by a brazing process there is every possibility that the tips are not exactly even relative to the plane of the blade and that the latter may have a ripple like distortion following the brazing operation the placing of the blade on the worktable such that it is supported by the tips it is highly likely that the blade body would be inclined thereto and would negate any possibility of accurate grinding of the side faces of the tips with respect to the plane of the blade.

To counteract this problem a shim or shims with accurately parallel surfaces is or are interposed between the blade body and the worksurface so that the tips are located out of contact with the surface 33.

Each shim thus has a diameter such that as much of the blade body is supported without co-operating with the tips.

The upwardly facing side faces are then ground by a grinding wheel assembly 35. The side faces can be the faces 17. This grinding stage not only produces the required form to the side faces 17 but additionally locates the ends Y of the cutting edge 19 in a first common plane relative to the worksurface 33.

The blade is then removed from the chuck. The shim or shims 34 is or are removed and replaced by a larger diameter shim 36 (FIG. 9), the diameter of the shim being greater than the overall diameter of the blade and tips. The blade is then replaced on the worktable so that the edge ends Y rest on the shim 26. That is the side faces 18 are now facing upwards. Suitable indication means are provided for ensuring that the blade is angularly set in the same position relative to the worksurface 33.

The side faces 18 are now ground by the assembly 35. This second grinding operation produces the required form to the side faces 18 and also ensures that the associated ends Z of the cutting edges lie in a second common plane which is parallel to the plane containing the ends Y of the edges 19. The accuracy of the grinding operation can be to whatever degree of dimensional tolerance thought desirable, for example to 0.0025 mm.

If desired the second shim can be stepped so as to ensure that the body of the blade is sufficiently supported during grinding. It is important however to ensure that the tip ends Y are in uniform contact with the shim 36.

The grinding wheel assembly for grinding the side faces 17 and 18 will now be considered in detail.

Referring to FIG. 8 the assembly includes a grinding wheel 37 carried on a shaft 38. The wheel 37 has a domed or crowned grinding surface whose contour can be part of a sphere or other surface of revolution. The wheel is so positioned with respect to the axis 39 of rotation of the blade that the axis 40 of rotation of the grinding wheel is, as seen in FIG. 8, parallel to that of the blade 30. In addition, the wheel 37 is positioned such that its axis is located radially inwardly of the base of the tip 7 that is being ground at any instant.

Turning now to FIG. 9 this illustrates so far as the grinding wheel assembly is concerned a view in the direction of the arrow X of FIG. 8. The axis 40 of the grinding wheel shaft 38 is so inclined to the vertical that the centre of rotation of the wheel lies to the right as seen in FIG. 9.

In the particular embodiment shown in FIGS. 8 and 9 the axis 40 is inclined at the side relief angle to the vertical. This angle is 15°. The wheel has a diameter of 6 inches and is diamond tipped. The axis 40 is located, as seen in FIG. 8, approximately 12.5 mm from the outer periphery of the tips.

The positioning of the wheel 37 relative to the worksurface 33 is such that the lateral width of the cutting edge 19 extends laterally 0.012 inches (0.305 mm) either side of the blade body when the overall tip length is 0.375 inches (9.5 mm).

After the side faces of the tips have been ground in the manner discussed above it is necessary to grind the faces of the blade body so that they are parallel to the planes containing the tip cutting edge ends Y and Z. To effect this grinding it is convenient to use a second grinding assembly. This second assembly can be of any convenient form provided that it is provided with a suitable magnetic or pneumatic chuck or workpiece clamp.

The blade face grinding sequence involves placing the blade with the tip cutting edge ends in contact with the assembly workpiece surface (a shim can be used if thought necessary to avoid damage to the worksurface). The worktable is rotated at a convenient speed and the blade surface is ground by a peripheral grinding wheel which is displaced radially of the blade to effect the required radial form of grinding.

After the first one of the faces has been thus ground the remaining surface is similarly ground.

After this grinding operation the blade surfaces are both parallel to the planes containing the ends of the cutting edges.

In an alternative form of grinding the side faces the grinding can be such that the undercutting is not smoothly dished or concave but is of the form of a Vee or U having a very short side towards the cutting edge and a much longer side leading towards the base of the tip.

The undercutting of the side faces can be effected on saws having the point attack cutting edges.

Furthermore, the saws having the tips of the invention can be used to cut materials other than metal e.g., laminates, wood etc.

From the foregoing it will be appreciated that saws prepared in accordance with the method of the invention have a higher degree of tolerance on width of cut in relation to kerf width.

I claim:

1. A planar cutter blade including a body having oppositely presented flat parallel lateral faces and having an edge region with a series of regularly spaced gullet forming notches provided therein, each such notch being shaped to provide a workpiece cutter tip insert receiving region located, in relation to the direction of intended cut of the blade, at the rear of the notch; a cutter tip secured in each said region of the gullets each tip presenting a rear face and a bottom face towards the tip receiving region of the notch and having a front face and a top face which are inclined to each other to define the workpiece cutting edge of the tip, and two opposed side faces which are inclined towards each other both in the direction front face towards the rear face and in the direction top face towards the bottom face, with each of said side faces also being dished in such manner that the lines of intersection of the two side faces with the front face are curved inwards to each other whereby the narrowest width region of the front face is intermediate the top face and the bottom face.

2. A planar cutter blade as claimed in claim 1, and in which the cutter blade is circular and is operationally rotatable about an axis of rotation the dishing of the side faces is such that the transverse width of the front face at a radial distance from the axis of rotation equal to the radial distance from the axis to the rear edge of the tip as defined by the line of intersection of the top face with the rear face is the same as the transverse width of the tip rear edge.

3. A planar cutter blade as claimed in claim 1, and in which the cutter blade is of rectilinear form and is moved rectilinearly in use, the dishing of the side faces is such that the transverse width of the front face in a plane which is parallel to the direction of rectilinear movement and which includes the rear edge of the tip as defined by the line of intersection of the top face with the rear face is the same as the transverse width of said rear edge.

4. A planar cutter blade as claimed in claim 2, in which the dishing is composed of a compound curvature involving two axes of curvature contained in planes which are inclined to each other and which are also offset with respect to the perpendiculars to the plane of the blade body so that each side face is curved in a direction rearwards from the front face and downwards from the top face.

5. A planar cutter blade as claimed in claim 4, in which the dishing is such that the side faces are curved outwardly from the region of maximum depth of the dishing to merge with the lateral faces of the body in the vicinity of said tip insert receiving region of the gullet notch.

6. A planar cutter blade as claimed in claim 1, in which the dishing of the side faces is such in the direction rearwardly and downwardly from the workpiece cutting edge and at a location immediately beneath the cutting edge the rate of change in the transverse width of the front face from the cutting edge to the narrowest width is greater than the rate of change in the front face width beneath such narrowest width.

7. A planar cutter blade as claimed in claim 1, in which the tip front faces form substantially the whole of the rear walls of the gullets.

8. A planar cutter blade as claimed in claim 1, in which the side faces are dished for the full radial length of the tip.

9. A planar cutter blade as claimed in claim 1, in which the dishing of the side faces extends from the front faces to the rear faces of the tips.

* * * * *